Nov. 22, 1938.  J. J. JAKOSKY  2,137,650
APPARATUS FOR ELECTRICAL EXPLORATION OF SUBSURFACE
Filed June 7, 1937
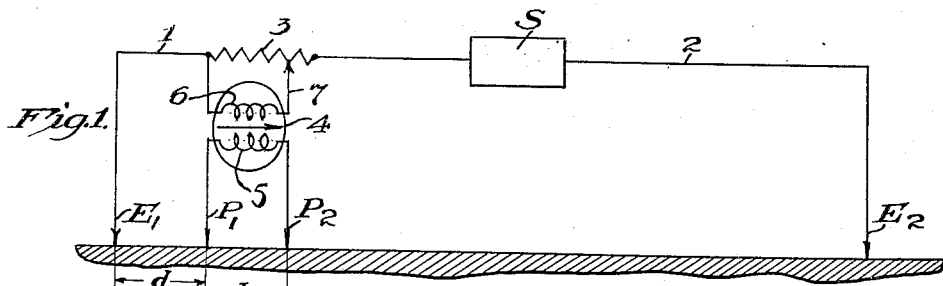
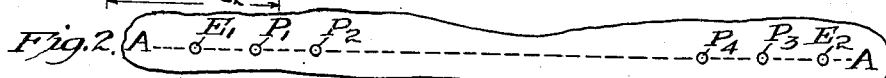
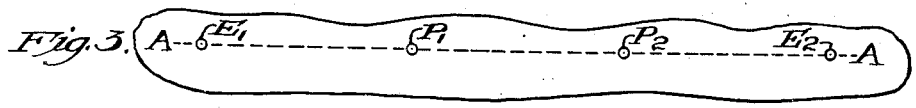
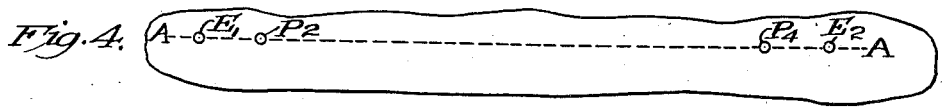
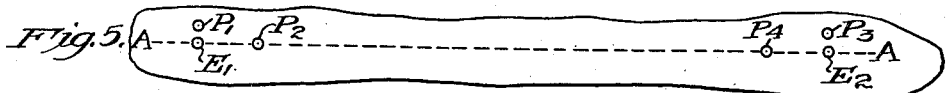
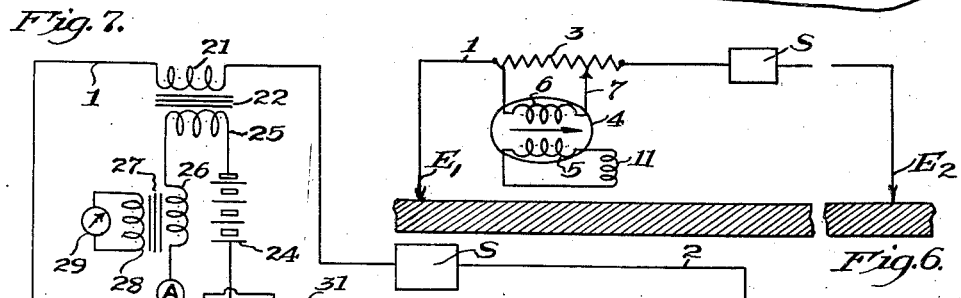
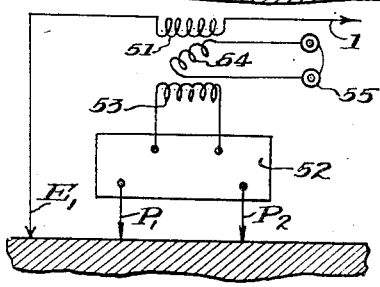
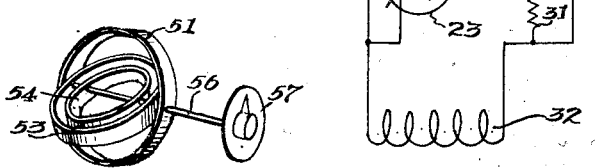
INVENTOR.
John Jay Jakosky
BY
ATTORNEYS.

Patented Nov. 22, 1938

2,137,650

UNITED STATES PATENT OFFICE 2,137,650

APPARATUS FOR ELECTRICAL EXPLORATION OF SUBSURFACE

John Jay Jakosky, Los Angeles, Calif.

Application June 7, 1937, Serial No. 146,781

2 Claims. (Cl. 175—182)

This invention relates to geophysical surveying and is concerned more specifically with an advantageous method and apparatus for conducting such surveys.

A particular object of the invention is to provide a simple method and apparatus for obtaining the relation between the value of an energizing current supplied to the earth and a quantity dependent upon the geologic nature and characteristics of the subsurface traversed by said current, such as the potential gradient or magnetic field strength, at positions on the earth influenced by said energizing current.

According to common survey practice an electrical energizing current is passed through the earth between a pair of spaced electrodes and potential or magnetic measurements are taken at different points on the surface of the earth which are influenced by the flow of said current. In order to evaluate such measurements the value of the energizing current is usually recorded for each measurement and the distances and positions of the various electrodes are noted so that the resistivity or other property of the earth may be calculated.

It is a particular object of this invention to overcome the necessity of recording the value of current for each value of potential or magnetic field by providing an apparatus which will give the relation of these two variables directly.

Another object of the invention is to provide a method for the electrical exploration of the subsurface which may be practiced without the direct measurement of any conventional electrical quantities such as current or potential, but which depends upon the ratio of such quantities without requiring knowledge of their absolute value.

Further objects and advantages of the invention will either be more specifically brought out in the following description or will be apparent therefrom.

According to this invention an electric energizing current is passed through the earth between a pair of electrodes which are electrically connected to the earth and spaced from one another along the surface thereof and a measurement is made of the relation between the value of said energizing current and the value, at a position on the surface of the earth and preferably adjacent one of said electrodes, of a quantity which depends on the geologic nature and characteristics of the subsurface traversed by the current.

The apparatus of this invention comprises, in general, means for passing an electric current through the earth between a pair of electrodes electrically connected to the surface of the earth and spaced from one another along the surface thereof, and means for measuring the relation between said current and the value, at a position on the surface of the earth, of a quantity which depends upon the geologic nature and characteristics of the subsurface traversed by the current.

I have illustrated a simple embodiment of my invention and several modifications thereof in the accompanying drawing, and referring thereto:

Fig. 1 is a diagrammatic illustration of a simple embodiment of apparatus according to my invention showing its relation to various other apparatus used in a typical electrical survey;

Figs. 2, 3, 4, and 5 show various electrode arrangements with which my apparatus may be usefully employed;

Fig. 6 is a diagrammatic representation of a modified form of apparatus according to my invention;

Fig. 7 is a diagrammatic illustration of a modified form of apparatus particularly adapted for use with alternating currents;

Fig. 8 shows a modified arrangement of a portion of the apparatus shown in Fig. 7;

Fig. 9 is a diagrammatic representation of a form of apparatus which is useful with alternating currents; and Fig. 10 is a perspective detail of a portion of the apparatus shown diagrammatically in Fig. 9.

Referring to Fig. 1, I have shown a pair of energizing electrodes $E_1$ and $E_2$ connected to the surface of the earth and to a source of current S through insulated conductors 1 and 2. Inserted in the conductor 1 between the source S and the electrode $E_1$ I have shown a resistor 3. The voltage across the resistor 3 will be a function of the current passing between the electrodes $E_1$ and $E_2$ and will vary directly in accordance therewith. A double winding galvanometer is shown at 4 having windings 5 and 6 which are carefully insulated from each other and are preferably connected in opposition, the winding 5 being connected to potential electrodes $P_1$ and $P_2$ which are connected to the surface of the earth and spaced from the electrode $E_1$ by the distances $d_1$ and $d_2$ respectively; while the winding 6 is connected to one end of the resistor 3 and to a variable tap 7 on said resistor. The galvanometer 4 may be of the d'Arsonval permanent magnet type having both of the windings 5 and 6 wound on the same frame, or it may be of a more complex type having two sets of magnets and coils in which the coils are mounted on a common shaft. The windings 5 and 6 do not necessarily produce the same torque for the same amount of current at each winding; however, it is beneficial to know the constants for each of the windings so that absolute instead of relative results may be obtained.

When an energizing current flows through the earth between the electrodes $E_1$ and $E_2$ a voltage will be produced across the resistor 3 which is directly proportional to the value of this energizing current, and a voltage drop will occur across the earth between the potential electrodes $P_1$ and $P_2$ which is a function of the energizing current and the geological nature and characteristics of the subsurface. The variable tap 7 on resistor 3 may be adjusted until a null reading is obtained on the galvanometer 4. By proper precalibration of the position on the resistor 3 of the tap 7, the position thereof can be made a means of quickly and accurately determining the value of the relation between the energizing current and the potential between $P_1$ and $P_2$.

It is appreciated that the relation between the potential obtained at a position on the earth and the value of the current passed between the electrodes $E_1$ and $E_2$ may vary somewhat with variations in the magnitude of said current. However, this variable is not particularly important if the value of current is maintained substantially constant, or is not varied over particularly wide limits. Thus a variation in current of five to ten per cent would not particularly affect the results obtained with this method, but would prove troublesome if it was necessary to know the exact value of the current in order to make calculations concerning the nature and characteristics of the subsurface. In the conventional method this current must be measured as accurately as the potential is measured, whereas in this method the accuracy of the results depends only on the reading of a single quantity which is a ratio of both current and potential, thereby obviating the measurement of either one or both quantities.

The resistivity of the earth as measured between a pair of potential electrodes is a function of the spacing between the electrodes and their relation with respect to the energizing electrodes, and of the relation between the energizing current and the potential existing between the potential electrodes. The apparatus of this invention provides a simple means of obtaining this relationship directly without the necessity of measuring either the energizing current or the potential existing between a pair of spaced electrodes separately. Thus, by knowing the distances between the potential electrodes, the distances $d_1$ and $d_2$, and the distance between the energizing electrodes, the resistivity of the earth included between the points $P_1$ and $P_2$ may be readily determined from the position of the variable tap 7 on the resistor 3 required to give a null reading on the galvanometer 4.

Numerous procedures may be employed for carrying out a survey with the apparatus shown in Fig. 1. For example, the distances $d_1$ and $d_2$ may remain fixed while the distances between the energizing electrodes $E_1$ and $E_2$ may be progressively increased or decreased. A comparable measuring apparatus may be inserted in the conductor 2 and connected to comparable potential electrodes adjacent electrode $E_2$, whereby ratio measurements may be taken adjacent both the electrodes $E_1$ and $E_2$ for each spacial arrangement of said electrodes.

In Fig. 2 I have shown a plan view of the electrode arrangement of Fig. 1 with all of the electrodes arranged substantially on the line A—A passing through the electrodes $E_1$ and $E_2$. The interval between potential electrodes $P_1$ and $P_2$ represents a position adjacent the electrode $E_1$, and the interval between potential electrodes $P_3$ and $P_4$ represents a position adjacent electrode $E_2$, and measurements may be taken of the ratio of the energizing current to the value of the potential drop at each of these positions, which depends upon the geologic nature and characteristics of the subsurface traversed by the energizing current. The electrodes $P_1$, $P_2$, $P_3$, and $P_4$ are shown as located inwardly of the adjacent energizing electrode $E_1$ or $E_2$, that is, between said energizing electrodes. It will be understood, however, that the electrodes $P_1$ and $P_2$ may be located outwardly of electrode $E_1$ and the electrodes $P_3$ and $P_4$ may be located outwardly of electrode $E_2$. It will also be appreciated that the respective pairs of potential electrodes $P_1$ and $P_2$, and $P_3$ and $P_4$, may be located on opposite sides of one of the respective energizing electrodes $E_1$ and $E_2$ and on a line passing through said energizing electrodes.

In Fig. 3 the energizing electrodes $E_1$ and $E_2$ and the potential electrodes $P_1$ and $P_2$ are shown arranged along a line A—A with distances $E_1$—$P_1$, $P_1$—$P_2$, and $P_2$—$E_2$ equal, as in conventional surveying practice, the position of measurement being defined by the interval $P_1$—$P_2$ intermediate the energizing electrodes $E_1$ and $E_2$.

When taking potential measurements one of the energizing electrodes may be utilized as a potential electrode, as indicated in Fig. 4, in which measurements may be taken of the relation between energizing current and the potential between an electrode $E_1$ and a potential electrode $P_2$ located adjacent and inwardly of the electrode $E_1$ and on the line A—A passing through the electrodes $E_1$ and $E_2$, and also of the relation between said current and the potential between electrode $E_2$ and a potential electrode $P_4$ adjacent and inwardly of electrode $E_2$ and on said line A—A. In this figure the positions of measurement would be indicated by the intervals $E_1$—$P_2$ and $E_2$—$P_4$.

I find it more advantageous, however, when taking measurements in the position indicated in Fig. 4, to take measurements between an auxiliary potential electrode located closely adjacent the energizing electrode, rather than to use the energizing electrode as a potential electrode. Such an arrangement is shown in Fig. 5, in which the electrodes $E_1$, $P_2$, $P_4$, and $E_2$ are arranged along a straight line A—A, with the electrodes $P_2$ and $P_4$ located as in Fig. 4, for example. The other potential electrodes $P_1$ and $P_3$ are located closely adjacent the electrodes $E_1$ and $E_2$, for example, from five to fifty feet therefrom, and to one side of the line A—A.

It will be appreciated that either one or both of the potential electrodes may be located on the side of the adjacent energizing electrode away from the other energizing electrode. For example, the electrodes $P_2$ and $P_4$ in Fig. 4 or Fig. 5 may be located on the line A—A outwardly of the respective energizing electrodes $E_1$ and $E_2$.

Referring to Fig. 6 I have shown an apparatus somewhat comparable to that shown in Fig. 1, which may be used for taking measurements dependent upon magnetic field strength, with either direct or alternating currents. In this embodiment of my apparatus the winding 5 of the galvanometer 4 is connected to a pick-up coil 11 which is shown located intermediate the electrodes $E_1$ and $E_2$ and preferably adjacent one of said electrodes. The other winding 6 of the galvanometer is connected to the resistor 3 in the conductor 1 as shown in Fig. 1. When alternating currents are utilized the coil 11 may remain stationary and is preferably aligned with its axis horizontal and at right angles to a line passing through the electrodes $E_1$ and $E_2$ in order to get the greatest effect from the horizontal lines of the magnetic field produced by the current flowing through the earth between the electrodes $E_1$ and $E_2$. When using alternating current a galvanometer of the dynamometer type is preferably utilized; however, a direct current galvanometer may be employed if suitable rectifiers are inserted in the leads thereof. In the event that direct currents are used, the pick-up coil 11 may be rotated according to conventional practice. When current is passed through the earth, the variable tap 7 may be adjusted as before, and the position thereof when a null reading is obtained on the galvanometer will give a measurement of the relation between the energizing current and the magnetic field strength at the position of the coil 11. A similar apparatus may also be used for measuring this relationship at a position adjacent electrode $E_2$.

It will be appreciated that the resistor 9 in Figs. 1 and 6 may be fixed and the coil 6 may be connected in a fixed relation to said resistor. In such an event a resistor may be connected between $P_1$ and $P_2$ in Fig. 1 or across the coil 11 in Fig. 6 and provided with a variable tap so that a portion of the potential existing between the electrodes $P_1$ and $P_2$, or across the coil 11, may be associated with the coil 5. In this event the last-named resistor may be calibrated and the required relation may be read directly from said resistor. In any event I produce a potential which varies with the value of the energizing current by inserting either a fixed or variable resistor, such as 3, in a conductor connecting an electrode to the source of current, and a second potential which varies with the value of the energizing current and the geologic nature and characteristics of the subsurface traversed by the energizing current, such as the potential existing between $P_1$ and $P_2$ or across the coil 11 during the flow of the energizing current, and associate one coil of said indicating instrument with one of said potentials and the other coil of said instrument with a variable portion of the other of said potentials. It will also be appreciated that suitable amplifiers may be inserted in the electrode or pick-up coil circuits, if necessary.

The apparatus shown in Fig. 7 is particularly adapted for use with alternating currents of low frequency or for use with long wave pulses. Electrodes $E_1$ and $E_2$ are shown connected to the earth and to a source of power S through the respective conductors 1 and 2 and the primary 21 of a current transformer 22 is inserted in the conductor 1 between the electrode $E_1$ and the source S. Potential electrodes $P_1$ and $P_2$ are respectively connected to the cathode and grid of an electron discharge device 23 which has a plate circuit comprising a battery 24, a secondary 25 of the transformer 22 and a primary 26 of a meter transformer 27, all of which are connected in series. The meter transformer 27 has a secondary winding 28 connected across a suitable indicating instrument 29 and a source of variable bias 31 is shown connected in the grid circuit between the electrode $P_2$ and the grid of the electron discharge device 23.

With no current flowing through the earth between the electrodes $E_1$ and $E_2$ the bias 31 may be adjusted to give a safe value of plate current as indicated by the ammeter A in the plate circuit of the discharge device and also as indicated by the reading of the indicating instrument 29. The energizing current may then be applied to the earth and the ratio of said energizing current to the value of the potential at the position indicated by the interval $P_1$—$P_2$ may be read directly from the instrument 29 upon proper calibration thereof. The device may also be operated by utilizing a given value of energizing current and adjusting the bias 31 to give a null reading on the instrument 29.

It will be appreciated that when any frequencies, except the lowest frequencies, are used with the above apparatus, some form of phase shift compensator must be employed for accurate results.

The apparatus shown in Fig. 7 may be employed for taking magnetic ratio measurements by connecting a suitable pick-up coil in the grid cathode circuit of the discharge device 23 in the place of the electrodes $P_1$ and $P_2$. In Fig. 8 I have shown the discharge device 23 with a pick-up coil 32 connected across the grid cathode circuit thereof. This apparatus is primarily intended for use with alternating currents or long wave impulses and the axis of the coil 32 is preferably aligned horizontally and at right angles to a straight line passing through the electrodes $E_1$ and $E_2$.

Referring to Figs. 9 and 10 I have shown a simple apparatus and apparatus arrangement which simplifies the procedure when taking alternating current measurements. The energizing electrode $E_1$ is shown connected to the earth and to the conductor 1 which leads to a suitable source of power, not shown. Inserted in the conductor 1 is a coil 51 which carries the energizing current supplied to the earth and produces an electromagnetic field which varies in accordance with the value of said current. Electrodes $P_1$ and $P_2$ are connected to the earth and to the input terminals of a suitable amplifying device 52 which has output terminals connected to a second coil 53 insulated from coil 51. The amplifier 52 is preferably a voltage-operated device, in order to obviate distortion of the potential field on the earth and prevent contact drop at $P_1$ and $P_2$, and the current produced in said coil 53 preferably varies in accordance with variations in potential between $P_1$ and $P_2$. A third and variable pick-up coil is indicated at 54 and is shown connected to an indicating device such as headphones 55. The headphones may be replaced by a suitable indicating instrument, and an amplifier may be inserted in the circuit between the coil 54 and the indicating device, if desired.

The coils 51 and 53 are preferably arranged in a fixed relation with their axes mutually perpendicular and with one coil fitted within the other; for example, the coil 53 is shown fitted within the coil 51. The coil 54 is shown with its axis passing through the point of intersection of the axes of the coils 51 and 53. The planes of the coils 51 and 53 may also be said to intersect at right angles in a line which passes through the point of intersection of their axes. This line would lie in the center of a rotatable shaft indicated at 56 which is fixed to the coil 54 so that said coil may be rotated within said mutually perpendicular coils about the shaft 56 as an axis. It may be seen then, that the coil 54 rotates about an axis which lies in the plane of said coil and is perpendicular to the axis thereof.

It will be appreciated that the coils 51 and 53 do not have to be mutually perpendicular but may be mounted transverse to one another so that their axes are transverse to one another and substantially or approximately intersecting, in which event the planes of the two coils would intersect in a line passing approximately through the point of intersection of the axes. It will also be appreciated that the coil 54 may be mounted outwardly of the coils 51 and 53 and that numerous other changes of form and arrangement of said coils may be made without departing from the spirit of this invention.

In operation the alternating energizing current produces an electromagnetic field about coil 51 which is proportional to the value of said current; the current in the coil 53, and the electromagnetic field produced thereby, is proportional to the potential difference between $P_1$ and $P_2$; the resultant electromagnetic field produced by the coils 51 and 53 is, therefore, a function of the relation of said energizing current to the potential existing between $P_1$ and $P_2$.

Thus by rotating the coil 54 by means of shaft 56, in a quadrant in which the fields of coils 51 and 53 produce opposing effects in coil 54, a position of said coil 54 may be found where a minimum value of current flows in said coil circuit, for example, as indicated by a minimum of tone in the phones 55. A suitable index and dial plate may be provided as at 57 so that the position of the coil 54 may be recorded. The dial may be calibrated so that the relation of the value of the energizing current to the value of a quantity, such as the potential between $P_1$ and $P_2$, which depends upon the geologic nature and characteristics of the subsurface traversed by the energizing current, may be read directly therefrom.

It will be appreciated that a pick-up coil may be connected across the input circuit of the amplifier in the place of the electrodes $P_1$ and $P_2$ after the manner shown in Fig. 8, whereby measurements may be taken which are dependent upon the electromagnetic field strength.

Ratio measurements are preferably made adjacent both of the energizing electrodes in order to produce more data and to provide for the positive differentiation of near-surface effects from the effects of deeper lying structure of economic importance. Near-surface effects usually appear as anomalies adjacent one of the electrodes which do not appear adjacent the other and may, therefore, be easily noted when measurements are taken adjacent both of the electrodes. It is for this reason that I prefer to measure the relation of the energizing current to the value, at a position adjacent one or both of the energizing electrodes, of an electrical quantity which depends upon the geologic nature and characteristics of the subsurface traversed by the energizing current, rather than at a position intermediate the energizing electrodes as shown in Fig. 3.

Numerous procedures may be utilized for carrying out a survey when practicing the method of this invention. For example, the energizing electrodes may be made to have different spacial relationships on the surface of the earth by moving said electrodes progressively outwardly or inwardly along a straight line by moving either one or both of said electrodes, or the energizing electrodes may be moved to different spacial relationships by moving both of said electrodes along a straight line while maintaining a constant spacing between said electrodes, or the energizing electrodes may be moved to various spacial relationships by being moved to various positions on the earth's surface, for example, in different horizontal directions, with fixed or varying spacings. It should also be noted that the potential electrodes do not have to lie on the straight line passing through the energizing electrodes, but may be positioned at any place on the earth's surface at which the value of a quantity which depends upon the geologic nature and characteristics of the subsurface traversed by the energizing current is of sufficient magnitude to enable the operator to measure the relation of said quantity to the energizing current.

There are times when it is extremely valuable to utilize positions which do not lie on said straight line, for example, when determining the location and direction of faults or contacts, especially when running preliminary surveys to determine the best manner in which to lay out and conduct a survey over an area.

In the interest of economy, however, I find it preferable to arrange the electrodes along a straight line, as shown in Figs. 1-4, or substantially so, as shown in Fig. 5, or to take measurements at positions which lie substantially along a straight line, since such configurations simplify the surveying procedure.

It will be appreciated that the method of this invention is not necessarily limited to the measurement of the relation of the energizing current to the value, at a position adjacent an energizing electrode, of a quantity which depends upon the geologic nature and characteristics of the subsurface traversed by the energizing current. However, such a position is preferably adjacent an energizing electrode, since measurements taken at such positions show the greatest changes for changes in the subsurface structure. Thus in Figs. 2 and 8, the distance between electrodes $P_1$ and $P_2$ and $P_3$ and $P_4$ would preferably be on the order of one-fifth or less of the known distance between the electrodes $E_1$ and $E_2$ and the distance between the electrodes $E_1$ and $P_1$ and $E_2$ and $P_3$ would also be less than one-fifth of said known distance. Approximately the same relation could be advantageously maintained for the electrodes $P_1$ and $P_2$ and $P_3$ and $P_4$ in Fig. 5, as well as for the electrodes $E_1$ and $P_2$ and $E_2$ and $P_4$ in Fig. 4. In Figs. 6 and 8 the positions of the respective coils 11 and 32 are advantageously maintained at a position adjacent an energizing electrode, for example, at a distance therefrom on the order of one-fifth of the distance between the energizing electrodes. Such electrode arrangements and measuring positions are disclosed and claimed in my co-pending application Ser. No. 145,795, filed June 1, 1937.

I have also found it advantageous to maintain the positions above referred to, at a constant distance from an adjacent energizing electrode for each of the various spacial arranagements of the electrodes in a given survey.

I claim:

1. An apparatus for use in determining the geologic nature and characteristics of the subsurface, which comprises: a pair of electrodes electrically connected to the earth and spaced from one another by a known distance along the earth's surface, a source of unidirectional energizing current; conductors connecting said source to said electrodes; a resistor inserted in one of said conductors between one of said electrodes and said source, whereby a unidirectional potential is produced across said resistor which varies with the value of the energizing current flowing during the operation of said source; means for obtaining a unidirectional potential which varies with the value of said energizing current and the geologic nature and characteristics of the subsurface traversed by said current, including electrode means; an indicating instrument having two coils; and means associating one of said coils with one of said potentials and the other of said coils with a variable portion of the other of said potentials.

2. An apparatus for determining the relation of an energizing current to the difference in potential between two points connected to the earth and influenced thereby, which comprises: means for passing a unidirectional electric current through the earth including means for producing a unidirectional potential which varies in accordance with said energizing current; a pair of spaced electtrodes connected to the earth at points influenced by said energizing current; a double coil indicating instrument having one coil connected between said spaced electrodes; and means for impressing a variable portion of the potential produced by said second-named means across the other coil of said double coil instrument, whereby said two coils tend to move in opposite directions.

JOHN JAY JAKOSKY.